United States Patent
Berliner et al.

(10) Patent No.: US 11,689,599 B2
(45) Date of Patent: Jun. 27, 2023

(54) VIDEO AWARE COMMUNICATION WITH MULTIPLE TRANSPORT BLOCKS

(71) Applicant: QUALCOMM Incorporated, San Diego, CA (US)

(72) Inventors: Ran Berliner, Kfar-Aviv (IL); Assaf Touboul, Netanya (IL); Shay Landis, Hod Hasharon (IL); Yehonatan Dallal, Kfar Saba (IL); Roman Budilovsky, Lod (IL)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/064,522

(22) Filed: Oct. 6, 2020

(65) Prior Publication Data
US 2021/0321286 A1    Oct. 14, 2021

Related U.S. Application Data

(60) Provisional application No. 63/007,717, filed on Apr. 9, 2020, provisional application No. 63/007,715, filed on Apr. 9, 2020.

(51) Int. Cl.
*H04W 72/04* (2023.01)
*H04L 65/75* (2022.01)
(Continued)

(52) U.S. Cl.
CPC .............. *H04L 65/75* (2022.05); *H04L 65/61* (2022.05); *H04L 65/70* (2022.05); *H04N 19/146* (2014.11);
(Continued)

(58) Field of Classification Search
CPC ......... H04L 65/75; H04L 65/61; H04L 65/70; H04L 65/752; H04L 65/80; H04L 47/24;
(Continued)

(56) References Cited

U.S. PATENT DOCUMENTS 11,245,741 B2   2/2022  Berliner et al.
11,356,374 B2*  6/2022  Bevilacqua ......... H04L 47/2416
(Continued)

FOREIGN PATENT DOCUMENTS

WO    2018121840 A1    7/2018

OTHER PUBLICATIONS

International Search Report and Written Opinion—PCT/US2021/026018—ISA/EPO—dated Jul. 20, 2021.
(Continued)

*Primary Examiner* — Gims S Philippe
(74) *Attorney, Agent, or Firm* — Heejong Yoo

(57) ABSTRACT

Various aspects of the present disclosure generally relate to video aware wireless communication. In some aspects, a communication device may classify a set of packets of streaming video content based at least in part on one or more video characteristics; assign the set of packets to a plurality of data radio bearers based on the effect of the set of packets on the quality of experience; generate a plurality of transport blocks for each of the plurality of DRBs; and provide the plurality of transport blocks for transmission. Numerous other aspects are provided.

27 Claims, 8 Drawing Sheets

(51) Int. Cl.
  *H04N 19/146* (2014.01)
  *H04N 19/159* (2014.01)
  *H04N 19/172* (2014.01)
  *H04N 19/176* (2014.01)
  *H04N 19/625* (2014.01)
  *H04W 28/02* (2009.01)
  *H04L 65/61* (2022.01)
  *H04L 65/70* (2022.01)

(52) U.S. Cl.
  CPC ......... *H04N 19/159* (2014.11); *H04N 19/172* (2014.11); *H04N 19/176* (2014.11); *H04N 19/625* (2014.11); *H04W 28/0268* (2013.01)

(58) Field of Classification Search
  CPC .. H04N 19/146; H04N 19/159; H04N 19/172; H04N 19/176; H04N 19/625; H04N 21/2383; H04W 28/0268; H04W 28/085; H04W 28/0263
  USPC ........................................................ 370/235
  See application file for complete search history.

(56) References Cited

U.S. PATENT DOCUMENTS

| | | |
|---|---|---|
| 2004/0203657 A1 | 10/2004 | Koskelainen |
| 2008/0177884 A1 | 7/2008 | Agarwal |
| 2010/0142616 A1 | 6/2010 | Hegde et al. |
| 2012/0155398 A1* | 6/2012 | Oyman .................. H04L 47/26 370/329 |
| 2012/0307751 A1* | 12/2012 | Dinan .................. H04L 5/0042 370/329 |
| 2014/0082146 A1 | 3/2014 | Bao et al. |
| 2014/0233420 A1 | 8/2014 | Honda et al. |
| 2015/0138373 A1 | 5/2015 | Garcia et al. |
| 2016/0100230 A1* | 4/2016 | Ma ..................... H04N 21/4425 725/109 |
| 2016/0142935 A1* | 5/2016 | Oettl ................. H04W 28/0252 370/235 |
| 2016/0219088 A1* | 7/2016 | Ma .......................... H04L 65/61 |
| 2017/0364794 A1 | 12/2017 | Mahkonen et al. |
| 2019/0223194 A1 | 7/2019 | Arrobo Vidal et al. |
| 2019/0394527 A1 | 12/2019 | Chandrasekhar et al. |
| 2020/0099990 A1 | 3/2020 | Boggia et al. |
| 2020/0163052 A1 | 5/2020 | Ko et al. |
| 2020/0204312 A1 | 6/2020 | Xu et al. |
| 2020/0296011 A1* | 9/2020 | Jain .......................... H04L 41/40 |
| 2020/0322694 A1 | 10/2020 | Colligan et al. |
| 2021/0119751 A1 | 4/2021 | Mundarath et al. |
| 2021/0321115 A1 | 10/2021 | Berliner et al. |
| 2021/0321145 A1 | 10/2021 | Berliner et al. |

OTHER PUBLICATIONS

Munaretto D., et al., "Broadcast Video Streaming in Cellular Networks: An Adaptation Framework for Channel, Video and AL-FEC Rates Allocation", Wireless Internet Conference (WICON), 2010 The 5th Annual ICST, IEEE, Piscataway, NJ, USA, Mar. 2, 2010 (Mar. 2, 2010), pp. 1-9, XP031661437, paragraph [Section III.C], paragraph [Section IV.A], paragraph [Section IV.B].

* cited by examiner

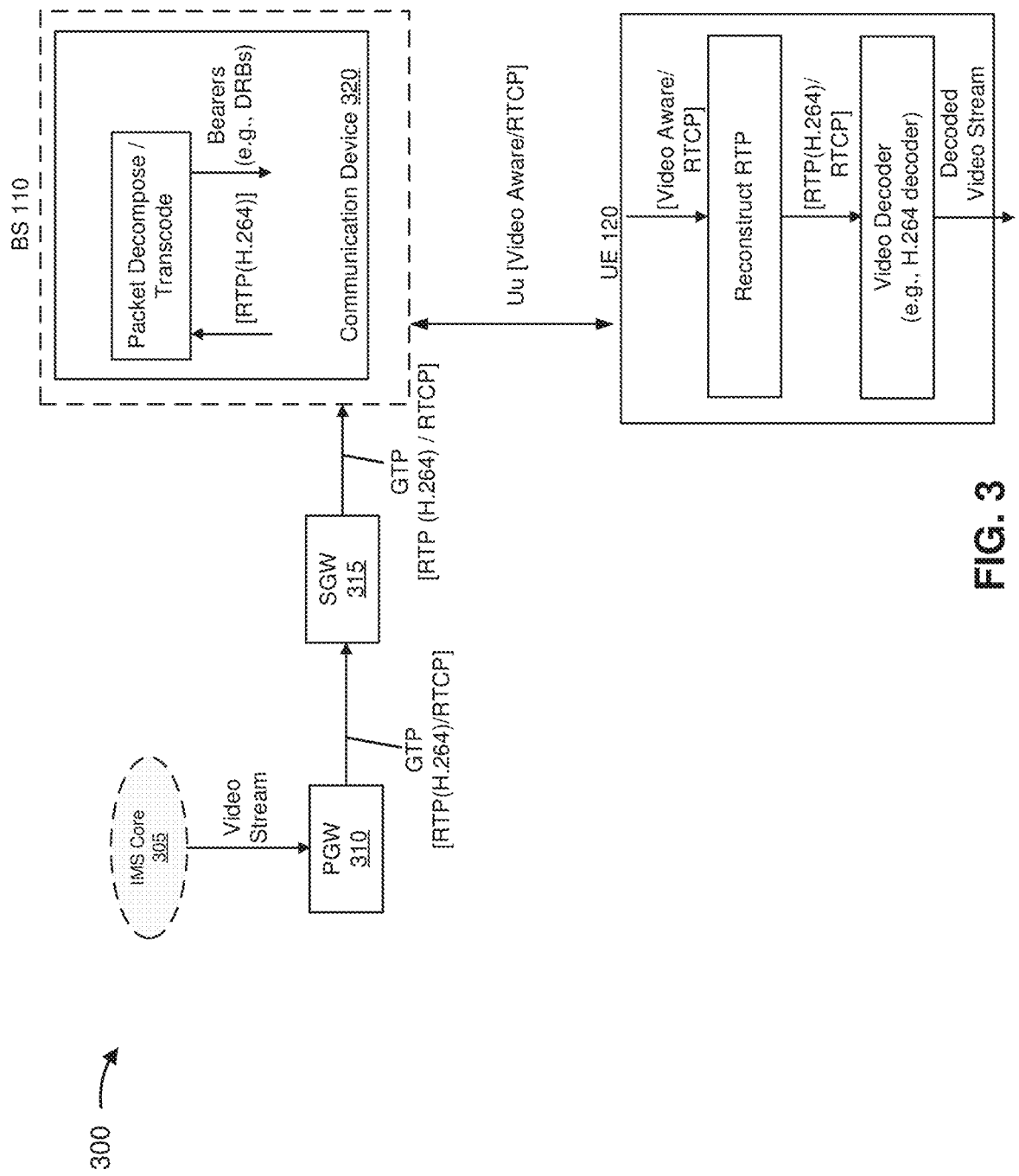

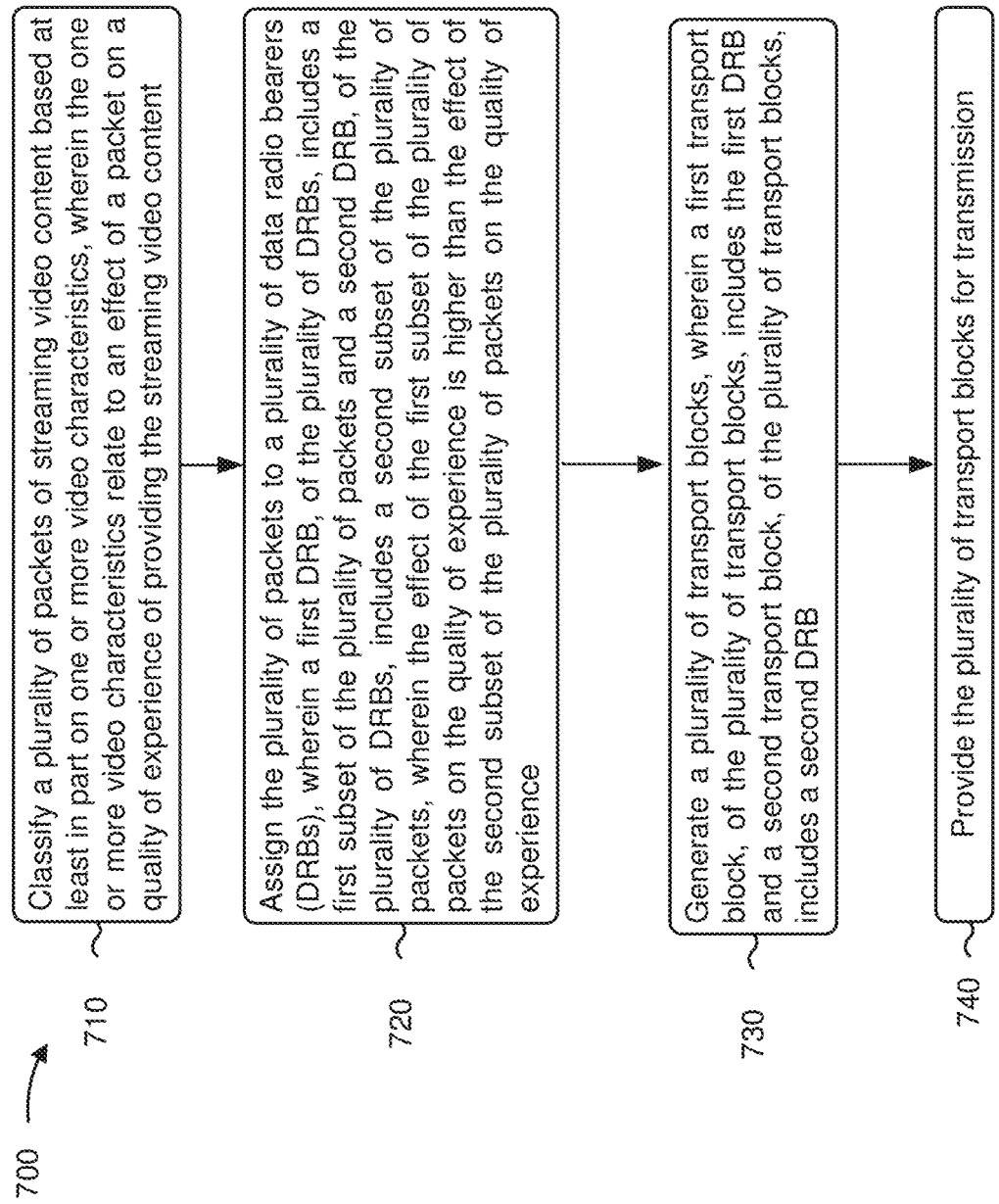

VIDEO AWARE COMMUNICATION WITH MULTIPLE TRANSPORT BLOCKS

CROSS REFERENCE TO RELATED APPLICATIONS

The present application claims priority from U.S. Provisional Patent Application No. 63/007,717 entitled "VIDEO AWARE TRANSMISSION AND MULTIPLE INPUT MULTIPLE OUTPUT LAYER PROCESSING," filed Apr. 9, 2020, and from U.S. Provisional Patent Application No. 63/007,715 entitled "VIDEO AWARE TRANSMISSION AND PROCESSING," filed Apr. 9, 2020, which are incorporated herein by reference in their entirety.

FIELD OF THE DISCLOSURE

Aspects of the present disclosure generally relate to wireless communication and to techniques and apparatuses for video aware communication with multiple transport blocks and processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a communication device, may include classifying a plurality of packets of streaming video content based at least in part on one or more video characteristics, wherein the one or more video characteristics relate to an effect of a packet on a quality of experience of providing the streaming video content; assigning the plurality of packets to a plurality of data radio bearers (DRBs), wherein a first DRB, of the plurality of DRBs, includes a first subset of the plurality of packets and a second DRB, of the plurality of DRBs, includes a second subset of the plurality of packets, wherein the effect of the first subset of the plurality of packets on the quality of experience is higher than the effect of the second subset of the plurality of packets on the quality of experience; generating a plurality of transport blocks, wherein a first transport block, of the plurality of transport blocks, includes the first DRB and a second transport block, of the plurality of transport blocks, includes a second DRB; and providing the plurality of transport blocks for transmission.

In some aspects, a communication device for wireless communication may include memory and one or more processors operatively coupled to the memory. The memory and the one or more processors may be configured to classify a plurality of packets of streaming video content based at least in part on one or more video characteristics, wherein the one or more video characteristics relate to an effect of a packet on a quality of experience of providing the streaming video content; assign the plurality of packets to a plurality of data radio bearers (DRBs), wherein a first DRB, of the plurality of DRBs, includes a first subset of the plurality of packets and a second DRB, of the plurality of DRBs, includes a second subset of the plurality of packets, wherein the effect of the first subset of the plurality of packets on the quality of experience is higher than the effect of the second subset of the plurality of packets on the quality of experience; generate a plurality of transport blocks, wherein a first transport block, of the plurality of transport blocks, includes the first DRB and a second transport block, of the plurality of transport blocks, includes a second DRB; and provide the plurality of transport blocks for transmission.

In some aspects, an apparatus for wireless communication may include means for classifying a plurality of packets of streaming video content based at least in part on one or more video characteristics, wherein the one or more video characteristics relate to an effect of a packet on a quality of experience of providing the streaming video content; means for assigning the plurality of packets to a plurality of data radio bearers (DRBs), wherein a first DRB, of the plurality of DRBs, includes a first subset of the plurality of packets and a second DRB, of the plurality of DRBs, includes a second subset of the plurality of packets, wherein the effect of the first subset of the plurality of packets on the quality of experience is higher than the effect of the second subset of the plurality of packets on the quality of experience;

means for generating a plurality of transport blocks, wherein a first transport block, of the plurality of transport blocks, includes the first DRB and a second transport block, of the plurality of transport blocks, includes a second DRB; and means for providing the plurality of transport blocks for transmission.

Aspects generally include a method, apparatus, system, computer program product, non-transitory computer-readable medium, user equipment, base station, communication device, and/or processing system as substantially described herein with reference to and as illustrated by the drawings, specification, and appendices.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a block diagram conceptually illustrating an example of wireless communication network in which a BS provides streaming video to a UE, in accordance with various aspects of the present disclosure.

FIG. 7 is a diagram illustrating an example process performed, for example, by a communication device, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
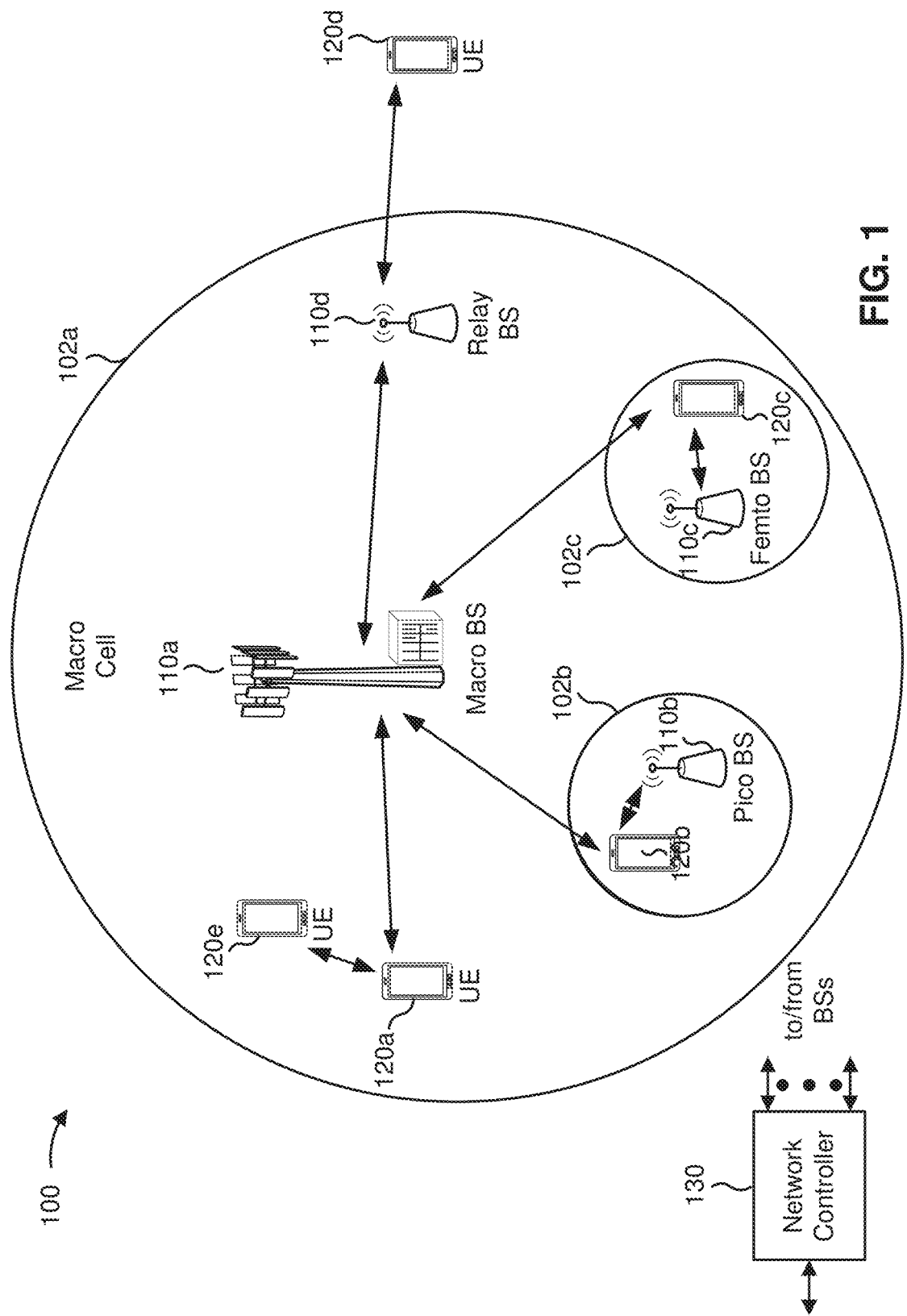
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. As indicated above, FIG. 1 is provided as an example. Other examples may differ from what is described with regard to FIG. 1.

Figure 2:
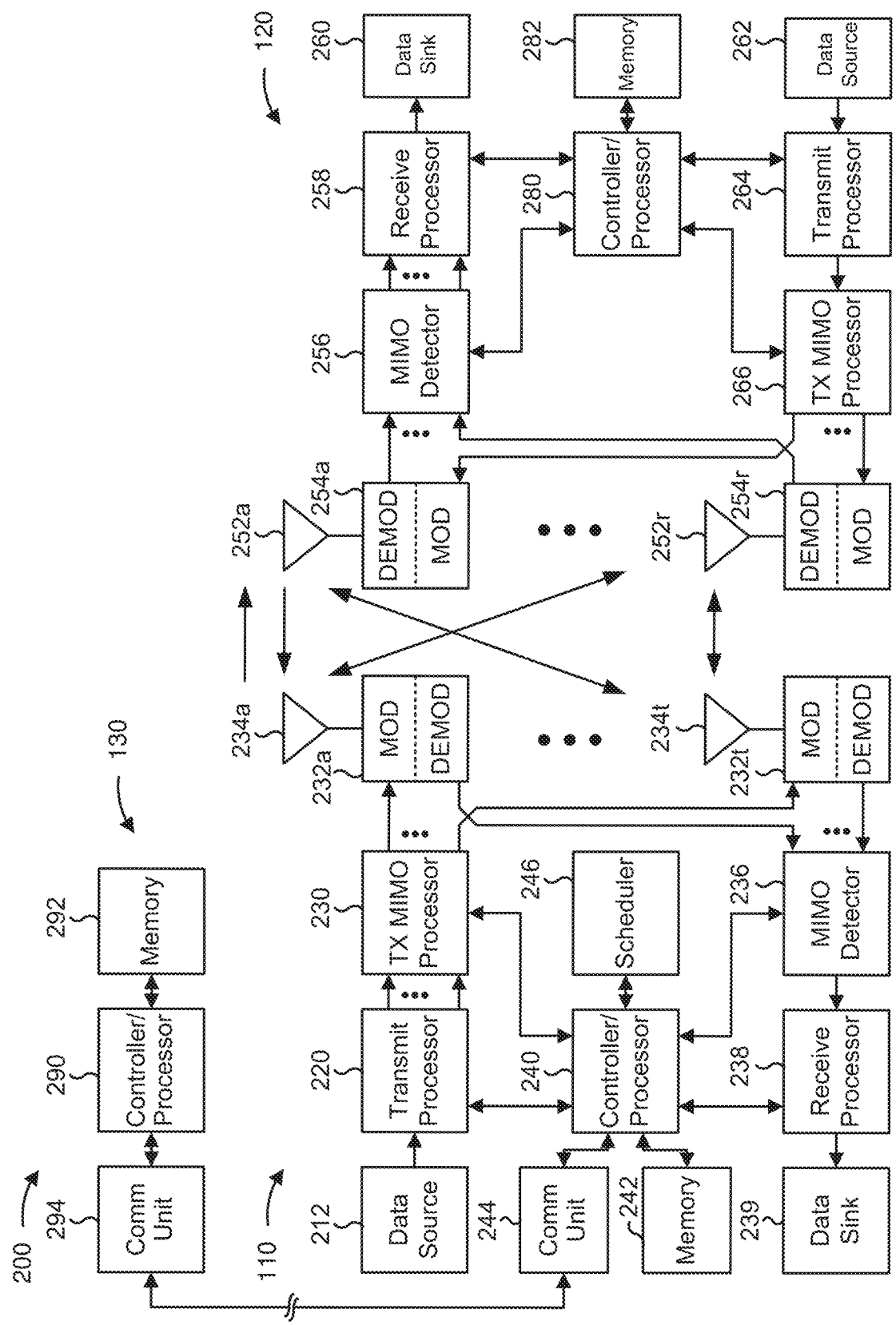
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with video aware multiplexing, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, a communication device (e.g., BS 110 or a video processing component thereof) may include means for classifying a plurality of packets of streaming video content based at least in part on one or more video characteristics, wherein the one or more video characteristics relate to an effect of a packet on a quality of experience of providing the streaming video content. The communication device may further include means for assigning the plurality of packets to a plurality of data radio bearers (DRBs). For example, a first DRB may include a first subset of the plurality of packets and a second DRB may include a second subset of the plurality of packets, wherein the effect of the first subset of the plurality of packets on the quality of experience is higher than the effect of the second subset of the plurality of packets on the quality of experience. The communication device may include means for generating a plurality of transport blocks. For example, a first transport block, of the plurality of transport blocks, may include the first DRB and a second transport block, of the plurality of transport blocks, may include a second DRB. The communication device may further include means for providing the plurality of transport blocks for transmission, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. As indicated above, FIG. 2 is provided as an example. Other examples may differ from what is described with regard to FIG. 2.

FIG. 3 is a block diagram conceptually illustrating an example of wireless communication network 300 in which a BS (e.g., BS 110) provides streaming video to a UE (e.g., UE 120), in accordance with various aspects of the present disclosure. As shown in FIG. 3, wireless communication network 300 may include an Internet Protocol (IP) multimedia core network subsystem (IMS) core 305, a packet data network gateway (PGW) 310, a serving gateway (SGW) 315, a BS 110 (e.g., which may include a communication device 320), and a UE 120. As further shown in FIG. 3, BS 110 and UE 120 may communicate via an access link (e.g., a Uu interface).

PGW 310 includes one or more devices capable of providing connectivity for UE 120 to external packet data networks (e.g., via IMS core 305). For example, PGW 310 may include one or more data processing and/or traffic transfer devices, such as a gateway, a router, a modem, a switch, a firewall, a network interface card (NIC), a hub, a bridge, a server device, an optical add-drop multiplexer (OADM), or any other type of device that processes and/or transfers traffic. In some implementations, PGW 310 may aggregate traffic received from one or more SGWs 315, and may send the aggregated traffic to IMS core 305. Additionally, or alternatively, as described in more detail herein, PGW 310 may receive traffic from IMS core 305 and may send the traffic to UE 120 via SGW 315 and BS 110. For example, PGW 310 may receive a video stream from IMS core 305 that is to be provided to BS 110 for processing and transmission to UE 120.

SGW 315 includes one or more devices capable of routing packets. For example, SGW 315 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, SGW 315 may aggregate traffic received from one or more BSs 110 associated with the wireless communication network 300 and may send the aggregated traffic to IMS core 305 (e.g., via PGW 310) and/or other network devices. SGW 315 may receive traffic from IMS core 305 (e.g., via PGW 310) and/or other network devices and may send the received traffic to BS 110 for processing and transmission to UE 120. For example, SGW 315 may receive real-time transport protocol (RTP) data and/or real time control transport protocol (RTCP) data with an RTP payload format, for example, such as H. 263, H.264 or H.265 (e.g., RTP data conveying the streaming video via general packet radio service (GPRS) tunneling protocol (GTP)). In this case, SGW 315 may provide the RTP data and/or RTCP data (e.g., the streaming video) to BS 110 via GTP and RTP and/or RTCP.

In some communications systems, such as Video Over 5G/NR (VoNR) or Video Over LTE (ViLTE), a BS and a UE may communicate using full duplex voice with either simplex or full duplex video streaming. The BS and UE may enable a relatively high level of synchronization between the voice and video streaming (which may be referred to, collectively, as streaming content), thereby enabling video-calling, streaming entertainment, and/or the like. The BS may activate dedicated bearers for transport of video and audio RTP traffic. The BS may assign different quality of service (QoS) levels for video (e.g., QoS class identifier (QCI) 2 for video) and audio (e.g., QCI 1 for audio), thereby providing some differentiation in reliability. For example, in this case, the BS prioritizes streaming audio, which may be delay and jitter sensitive, over streaming video, which may be less delay or jitter sensitive. In other words, during a video-conference use case, a brief interruption to audio from a speaker may be more disruptive to the video-conference than a brief interruption to video of the speaker.

However, at a medium access control (MAC) layer or physical (PHY) layer, the BS may perform procedures, such as scheduling, coding, modulation, multiplexing, orthogonal frequency division multiplexing (OFDM) symbol generation, and/or the like, agnostic of data that is being processed. In other words, the BS may process all data of a video stream without regard to what part of the video stream the data represents. As a result, interruptions to data transmission may result in excessively large effects to quality of experience (QoE) when the interruption affects a part of a video stream that has a large QoE effect.

Some aspects described herein provide video aware processing for streaming video. For example, as described below, a communication device (e.g., a BS or a component of a BS) may classify portions of streaming video based at least in part on an effect of each portion on QoE for the streaming video and may provide differential protection to portions based at least in part on the classification. In other words, the communication device may assign different portions of streaming video to different code blocks and/or transport blocks based at least in part on the classification. For example, the communication device may generate a first data stream for header data (e.g., RTP, user datagram protocol (UDP), IP header data), a second data stream for transparent operation, a third data stream for a first QoS classification, a fourth data stream for a second QoS classification, and/or the like.

Communication device 320 may include BS 110 or be a component of BS 110. For example, communication device 320 may be a video processing component that includes one or more of controller/processor 240, transmit processor 220, TX MIMO processor 230, MOD 232, antenna 234, and/or the like of BS 110. As shown in FIG. 3, BS 110 may decompose and/or transcode received packets (e.g., packets received from SGW 315) to identify underlying aspects of the data, such as different aspects of the streaming video (e.g., different video aspects, different audio aspects, and/or the like), as described in more detail herein. In this case, based on received RTP data (e.g., RTP H.264 payload data), communication device 320 may assign portions of the received data to different code blocks and/or transport blocks, and provide different quality of service to the different code blocks and/or transport blocks, and provide a set of data radio bearers (DRBs) based on different code blocks and/or transport blocks. In this case, BS 110 may provide the video aware DRBs and RTCP output data over the Uu interface to UE 120.

The communication device (e.g., the communication device 320) may provide differential protection to the different code blocks and/or transport blocks. In some aspects, the communication device may provide differential protection or reliability to different code blocks and/or transport blocks (e.g., the data streams composed thereof) based on the data streams therein. For example, the communication device may classify portion of the data streams (e.g., a plurality of packets of video streaming data). This classification may be based on one or more video characteristics relate to an effect of a packet on a quality of experience of providing the streaming video content. The one or more video characteristics may be related with video frame type information, such as intra-code picture frame (I-frame), predicted picture frame (P-frame), or the bidirectional predicted picture frame (B-frame), or time-to-frequency transformation, for example, Discrete Cosine Transform (DCT) coefficients. Alternatively, an effect of a packet on a quality of experience of video streaming may be determined based on degree of quality degradation, whether objectively or subjectively, when the packet was corrupted or missing during the transmission.

The communication device may classify a plurality of packets of streaming video content into at least a first subset and a second subset based on their effect on the quality of experience difference. In one implementation, the communication device may classify packets in such a way that the first subset of packets may comprise packets of which the effect of quality of experience are higher than that of packets included in the second subsect packets. For example, the first subset of packets may comprise only I-frame video packets and the second subset of packets may comprise P-frame and/or B-frame video packets.

The communication device may assign a plurality of packets to a plurality of data radio bearers (DRBs), For example, the communication device may assign the first subset of packets to a first DRB and the second subset of packets to a second DRB, wherein the effect of the first subset of the plurality of packets on the quality of experience is higher than the effect of the second subset of the plurality of packets on the quality of experience.

The communication device may generate a plurality of transport blocks and provide the plurality of transport blocks for transmission. In one aspect, the communication device may generate a first transport block to include the first DRB and a second transport block to include the second DRB. A transport block may refer to a chuck of data which is passed between the MAC and Physical layers. It is passed downwards at a transmitter and upwards at a receiver. A transport block undergoes Physical layer processing at a transmitter before being mapped onto a physical channel (e.g., PDSCH) for transfer across an air interface.

The communication device may provide the plurality of transport blocks for transmission. In one aspect, the communication device may provide the plurality of transport blocks for transmission by applying a first redundancy to the first transport block, which comprises the first DRB, and applying a second redundancy to the second transport block, which comprise the second DRB. For example, the first redundancy may be higher than the second redundancy, or the first redundancy may be same or lower than the second redundancy. In another aspects, applying different redundancy levels to transport blocks may result in a different coding rate even if the size of the transport blocks is same. For example, applying higher redundancy to a first transport block may result in a lower coding rate (i.e., adding more redundancy data so there is decreased transmission capacity for actual information bits of the first transport block), or applying lower redundancy to a second transport block may result in a higher coding rate (i.e., adding less redundancy data so there is increased transmission capacity for actual information bits of the second transport block). Additionally, or alternatively, adding higher (or lower) redundancy to a transport block may indicate applying higher (or lower) modulation scheme (e.g., using higher (or lower) modulation order for modulation), and/or applying more (or less) robust channel coding scheme to the transport block.

In another aspect, the communication device may provide the plurality of transport blocks for transmission by assigning a different quality of service (QoS) level to each of the transport blocks. The communication device may assign a first QoS level to the first transport block, and assign a second QoS level to the second transport block. In one implementation, the first QoS level assigned for the first transport block, which comprises the first DRB, may be higher than the second QoS level assigned for the second transport block, which comprises the second DRB. In another implementation, assigning higher QoS level to a transport block may be used interchangeably as applying higher redundancy to a transport block.

UE 120 may receive the video aware DRBs and the RTCP output data via the Uu interface. UE 120 may reconstruct the underlying RTP data (e.g., the RTP H.264 payload data) and process the underlying RTP data using a video decoder (e.g., an RTP H.264 decoder) to obtain a decoded video stream. As indicated above, FIG. 3 is provided as an example. Other examples may differ from what is described with respect to FIG. 3.

Figure 4A:
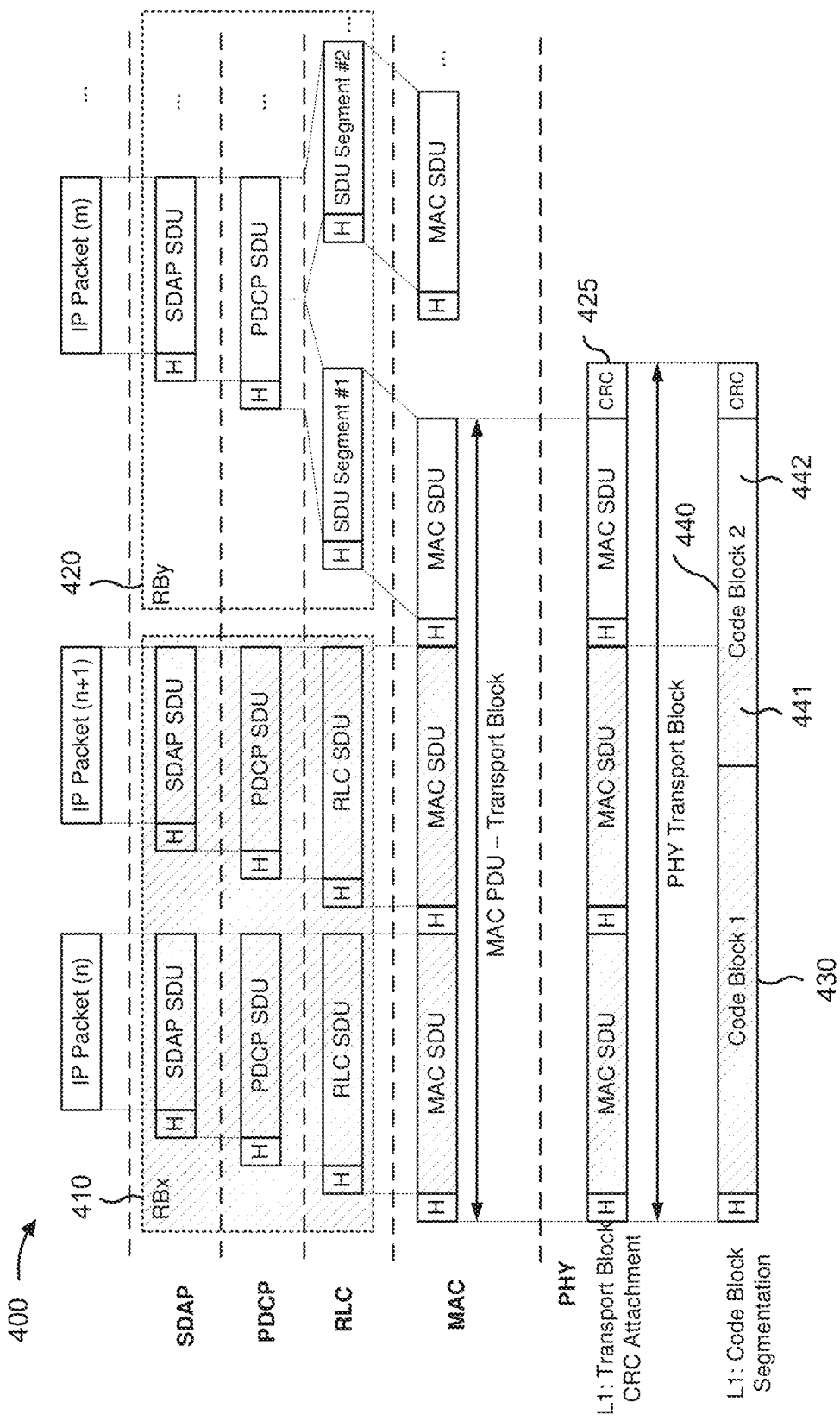
FIGS. 4A and 4B are block diagrams conceptually illustrating block production by a communication device to enable a BS to provide streaming video to a UE, in accordance with various aspects of the present disclosure.
Figure 4B:
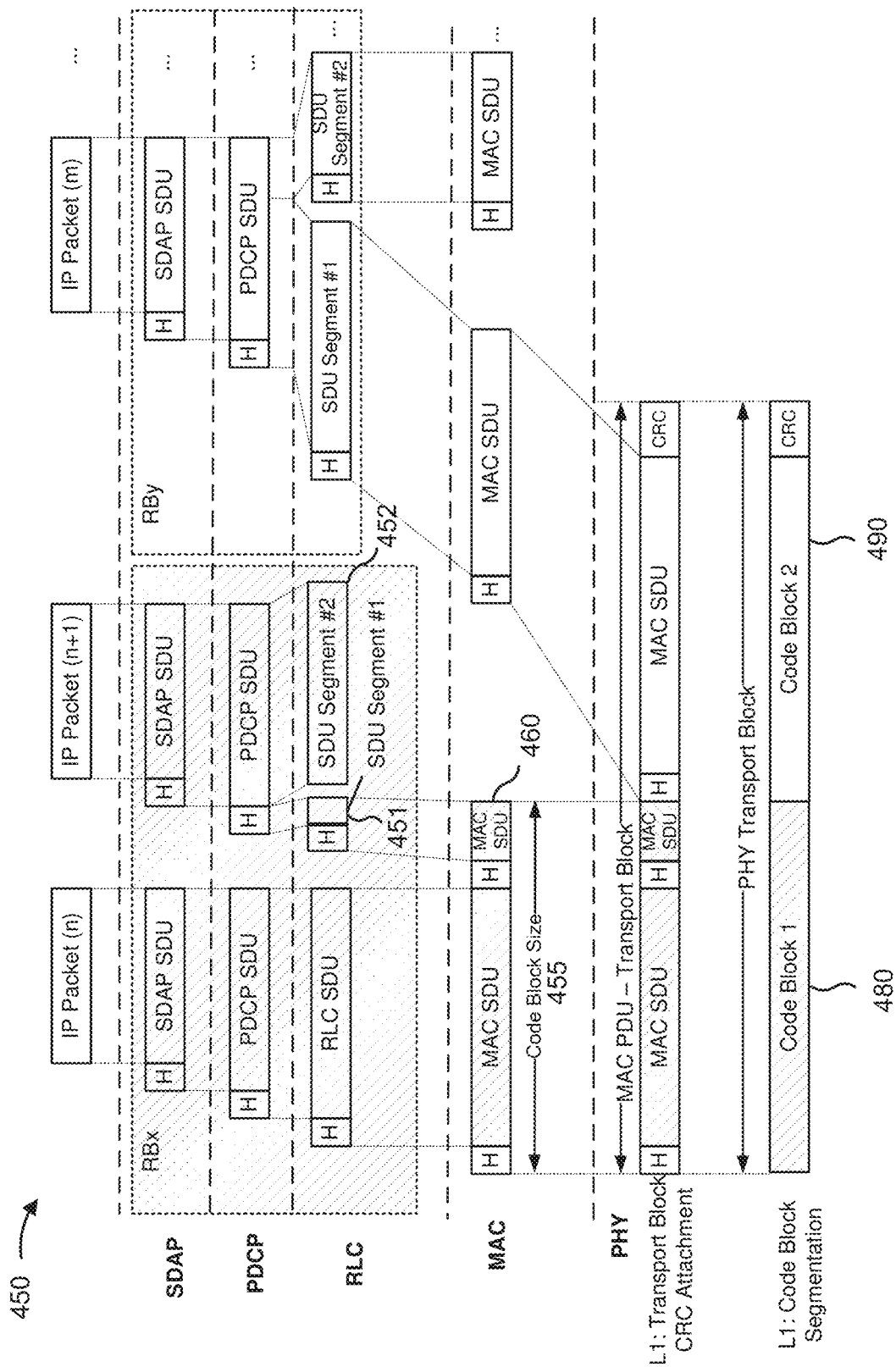

FIGS. 4A and 4B are diagrams illustrating examples 400 450 of block production by a communication device to enable a BS to provide streaming video to a UE, in accordance with various aspects of the present disclosure.

As shown in FIG. 4A, a medium access control (MAC) entity of a communication device may generate a transport block (e.g., based at least in part on service data adaptation protocol (SDAP) block generation, packet data convergence protocol (PDCP) block generation, and radio link control (RLC) block generation). For example, the MAC entity may concatenate two RLC protocol data units (PDUs) from a first radio bearer ($RB_x$) 410 and one RLC PDU from a second radio bearer ($RB_y$) 420. After concatenation, the communication device may add cyclic redundancy check (CRC) bits 425 and divide a transport block into a plurality of code blocks. In this case, a first code block 430 includes only data of the first radio bearer 410 whereas a second code block 440, for example, includes data 441 of the first radio bearer 410 as well as data 442 of the second radio bearer 420. As a result, based at least in part on data from a plurality of DRBs being multiplexed into a common code block 440, the communication device (e.g. via MAC entity or PHY entity) provides the same QoS (e.g., the QoS of the common code block) for each radio bearer.

In contrast, as shown in FIG. 4B, a communication device (e.g., BS 110, communication device 320, and/or the like) may include a MAC entity that may determine a code block size 450. The code block size in accordance with the present disclosure may refer to the size of code blocks used for channel coding. Channel coding within a PHY entity requires that code blocks to have specific sizes and that the maximum code block size is not exceeded. In some implementations, transport blocks, which comprise one or more MAC service data units (SDU) and CRC may be segmented to the code block size if needed. The MAC entity may determine the code block size 450 based on information from other entities, for example, such as a PHY entity or other higher entities. In this case, based at least in part on determining the code block size, the MAC entity of the communication device may allocate RLC PDUs to code block size units, such that different code blocks may be mapped to obtain different QoS, as described with respect to FIG. 4A. Additionally, or alternatively, a RLC entity may segment a RLC SDU (e.g., input data block unit to an RLC entity) in a plurality of segmented RLC SDUs based on the code block size 450. For example, the RLC entitiy may segment a regular size RLC SDU into a first RLC SDU segment 451 and a second RLC SDU segment 452 based on the code block size such that the MAC entity may allocate RLC PDUs (e.g., MAC SDUs) to the code block size by concatenating a first MAC SDU of regular size with a second MAC SDU of smaller size 460 comprising a segmented RLC SDU segment (e.g., SDU segment #1 451).

In some aspects, as shown in FIG. 4B, the first code block 480 includes only data from the first radio bearer (e.g., RBx 410) and the second code block 490 includes only data from the second radio bearer (e.g., RBy 420). In this case, the communication device may include padding bits to enable data of a radio bearer to fill an entire code block. In this way, based at least in part on ensuring that each radio bearer is in a separate code block from each other radio bearer, the communication device enables QoE based video-aware processing without changing a layer 1 (L1) block production procedure. In some implementation, As indicated above, FIGS. 4A and 4B is provided as an example. Other examples may differ from what is described with respect to FIGS. 4A and 4B.

Figure 5:
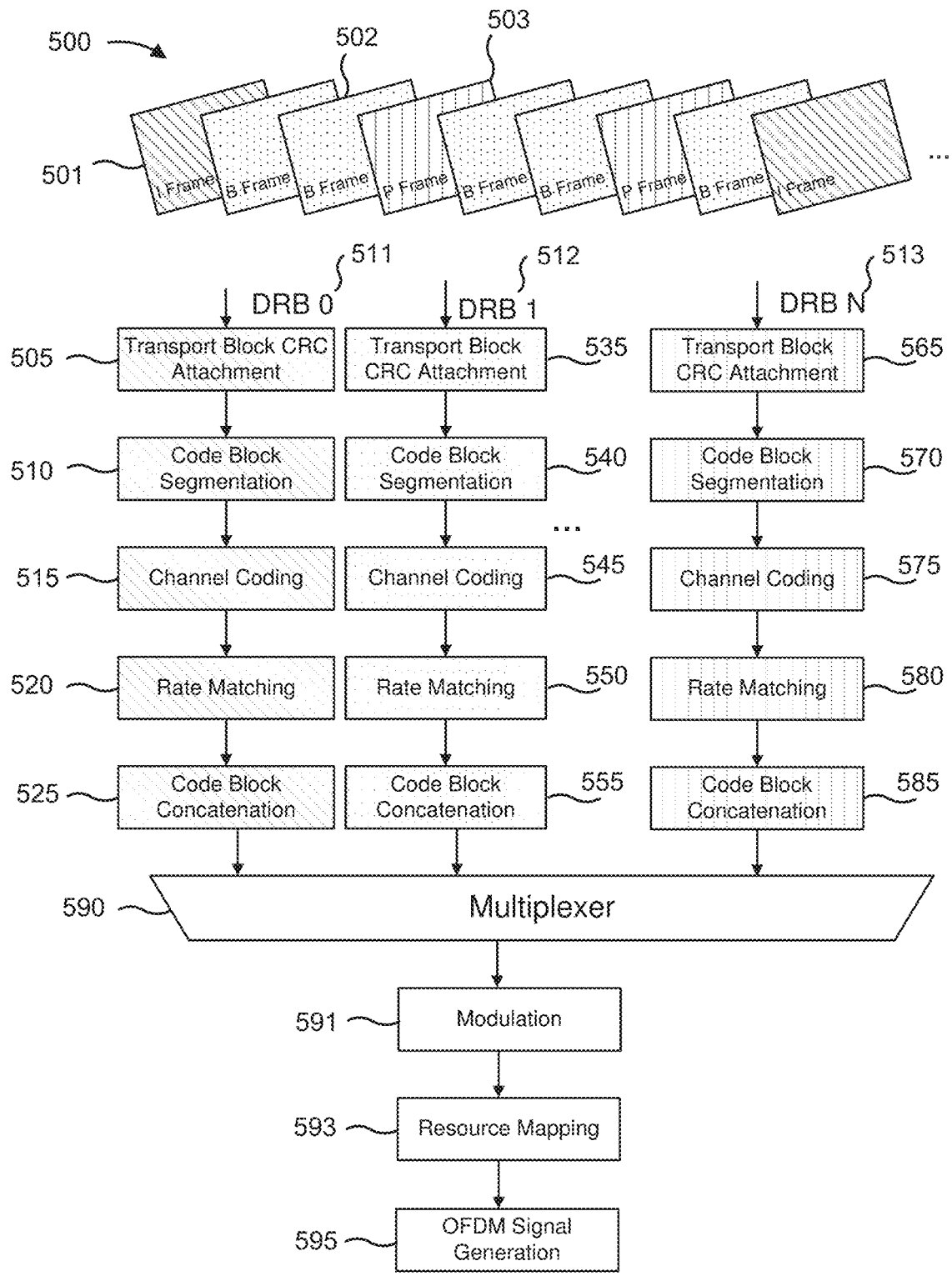
FIG. 5 is a block diagram conceptually illustrating data processing by a communication device to enable a BS to provide streaming video to a UE, in accordance with various aspects of the present disclosure.

FIG. 5 is a diagram illustrating examples 500 of data processing by a communication device to enable a BS to provide streaming video to a UE, in accordance with various aspects of the present disclosure.

Video encoders such as H.263, H.264, H.265, VP9, or AV1 exploit the redundancy between video frames (e.g., inter-frame redundancy) and/or the redundancy within a video frame (e.g., intra-frame redundancy) to achieve high-efficiency and high-quality video compression. Highly compressed video encoded streams comprises a plurality of video encoded components. These video streams are vulnerable to even a small number of packet loss due to communication channel errors to different degree depending on the location of video encoded components. In other words, transmission errors occurred on certain fields within video streaming may cause more quality degradation to overall video quality effect than other fields within the video streaming.

In some example, DCT or any other similar time-to-frequency transformations, such as Inverse DCT (IDCT) or Modified DCT (MDCT), have been frequently used in image compression and video compression for several decades due to their various superior properties associated with output transform coefficients. For example, it is well established principles that the lower frequency DCT coefficients are more important as far as the effect on the video quality experience than higher frequency DCT coefficients.

In another example, many advanced video compression algorithms apply different algorithms based on picture types or frame types. The three major video frame types used in video compressions are I-frame, P-frame and B-frame. I-frames do not normally exploit inter-frame redundancy and thus typically are the least compressible among these frames. I-frame, however, may have higher effect on the quality of video experience because I-frame often used as a reference frame to either P-frame or B-frame. P-frames can use data from previous frames (e.g., typically from previous I-frames) to decompress and are more compressible than I-frames. B-frames can use both previous (e.g., typically from previous I-frames or P-frames) and forward frames (e.g., typically from forward P-frames) for data reference to get the highest amount of data compression.

A communication device may determine a first code block (or transport block), among a plurality of code blocks (or transport blocks), may include a first subset of plurality of video packets, and a second code block (or transport block), among a plurality of code blocks (or transport blocks), may include a second subset of plurality of video packets. The communication device may further determine that the first subset of plurality of video packets may have higher effect on the quality of service experience than that of the second subset of plurality of video packets. As a non-limiting example, the first subset of plurality of video packets may include video compressed data related with I-frames and the second subset of plurality of video packets may include video compressed data related with P-frames or B-frames.

A communication device may decompose streaming content (e.g., streaming video) into a plurality of portions associated with different characteristics to enable providing video aware DRBs. In some aspects, the communication device (e.g., BS 110, communication device 320) may classify portions of the streaming content based at least in part on one or more video characteristics. The one or more video characteristics may relate to an effect of a packet on a quality of experience of providing the streaming video content. For example, the communication device (e.g., BS 110, communication device 320) may classify portion of the data streams (e.g., a plurality of packets of video streaming data). This classification may be based on one or more video characteristics relate to an effect of a packet on a quality of experience of providing the streaming video content. The one or more video characteristics may be related with video frame type information, such as I-frame, P-frame, or B-frame, or time-to-frequency transformation, for example, DCT or Discrete Fourier Transform (DFT) coefficients. Alternatively, an effect of a packet on a quality of experience of video streaming may be determined based on degree of quality degradation, whether objectively or subjectively, when the packet was corrupted or missing during the transmission.

A communication device may classify a plurality of packets of streaming video content into at least a first subset and a second subset based on their effect on the quality of experience difference. In one implementation, the communication device (e.g., BS 110, communication device 320) may classify packets in such a way that the first subset of packets may comprise packets of which the effect of quality of experience are higher than that of packets included in the second subsect packets. For example, the first subset of packets may comprise only I-frame video packets and the second subset of packets may comprise P-frame and/or B-frame video packets. In some aspects, as shown in FIG. 5, the communication device may perform this classification based on an I-frame category 501, a P-frame category 503, or a B-frame category 502. These are simply examples of categories that may be used. In practice, the communication device may classify the streaming content according to one or more other types of heuristics, or one or more video characteristics that may have different effect on a quality of video experience.

A communication device may assign different portions of the streaming content to different DRBs for further downstream processing (e.g., for transport block cyclic redundancy check (CRC) attachment, code block segmentation, channel coding, rate matching, code block concatenation, and/or the like, as described in more detail herein). In one implementation, the communication device (e.g., BS 110, communication device 320) may assign the first subset of packets to a first DRB 511 and the second subset of packets to a second DRB 512 513. The assignment of the first and second subsets of packets to the first and second DRBs, respectively, may be performed based on the their effect on the quality of experience difference. For example, the effect of the first subset of the plurality of packets on the quality of experience may be higher than the effect of the second subset of the plurality of packets on the quality of experience.

A communication device may generate a plurality of transport blocks and provide the plurality of transport blocks for transmission. For example, the communication device (e.g., BS 110, communication device 320) may generate a first transport block to include the first DRB 511 and a second transport block to include the second DRB 512. In one implementation, the communication device (e.g., BS 110, communication device 320), based at least in part on processing the plurality of DRBs 511 512 513, may attach, at CRC attachment stage 505 535 565, CRC to each transport block of each DRB in order to provide an error detection capability. The receiving communication device (e.g., UE 120) may use the CRC bits to determine whether or not the received transport blocks include any bit errors introduced during wireless transmission of video streaming.

A communication device may provide the plurality of transport blocks for transmission by applying a first redundancy to the first transport block, which comprises the first DRB, and applying a second redundancy to the second transport block, which comprise the second DRB.

The first redundancy may be higher than the second redundancy, or the first redundancy may be same or lower than the second redundancy, In one implementation, adding higher (or lower) redundancy to a transport block indicates adding more (or lower) redundancy data (e.g., cyclic redundancy check (CRC) bits) to the transport block. In another aspects, applying different redundancy levels to transport blocks may result in a different coding rate even if the size of the transport blocks is same. For example, applying higher redundancy to a first transport block may result in a lower coding rate (i.e., adding more redundancy data so there is decreased transmission capacity for actual information bits of the first transport block), or applying lower redundancy to a second transport block may result in a higher coding rate (i.e., adding less redundancy data so there is increased transmission capacity for actual information bits of the second transport block). Additionally, or alternatively, adding higher (or lower) redundancy to a transport block may indicate applying higher (or lower) modulation scheme (e.g., using higher (or lower) modulation order for modulation 591), and/or applying more (or less) robust channel coding scheme 515 to the transport block.

In some aspects, the communication device, based at least in part on processing the plurality of DRBs, may optionally segment, at code block segmentation stage 510 540 570, at least some transport blocks and CRC bits for ach DRB before channel coding 515 545 575 to ensure each code block has an appropriate number of bits not exceeding the maximum code block size for channel coding. The code block size in accordance with the present disclosure may refer to the size of code blocks used for channel coding.

In some aspects, the communication device, based at least in part on processing the plurality of DRBs, may apply, at channel coding stage 515 545 575, to signal from the code block segmentation stage 510 540 570. 3GPP 5G NR provides Low Density Parity Check (LDPC) coding for PDSCH and PUSCH and Turbo coding has been used for PUSCH in 3GPP 4G LTE. For example, the communication device (e.g., BS 110, communication device 320) may apply more robust channel coding scheme 515 to the first subset of transport block, which comprises the first DRB 511, and apply less robust channel coding scheme 545 575 to the second subset of transport block, which comprises the second DRB 512 513. In one implementation, the communication device (e.g., BS 110, communication device 320) may select one base graph among a plurality base graph to perform LDPC channel coding 515 for signal comprising the first DRB 511, and select another base graph among the plurality base graph to perform LDPC channel coding 545 575 for signal comprising the second DRB 512 513.

In some aspects, the communication device, based at least in part on processing the plurality of DRBs, may perform, rate matching procedure, at rate matching stage 520 550 580. The rate matching procedure processes each channel coded segment separately, typically, in 2 stages—bit selection and bit reducing. Bit selection reduces the number of channel coded bits to match the capacity of the allocated air-interface resources, and bit interleaving reorders the bit sequence. In one implementation, the communication device (e.g., BS 110, communication device 320) may perform more robust or higher rate matching 520 to the first subset of transport block, which comprises the first DRB 511, and perform less robust or lower rate matching 550 580 to the second subset of transport block, which comprises the second DRB 512 513. Code block concatenation stage 525 555 585 performs concatenating the set of code blocks into a single larger code block As further shown in FIG. 5, based at least in part on processing the plurality of DRBs, the communication device may perform multiplex the plurality of DRBs, modulate a multiplexed stream, perform resource mapping, and perform orthogonal frequency division (OFDM) symbol generation to enable transmission of the plurality of DRBs with differential protection.

In some aspects, the communication device (e.g., BS 110, communication device 320) may perform multiplexing function, at multiplexer stage 590, to a plurality of code blocks. Multiplexing function may involve multiplexing of data (e.g., video streaming data) with control information (e.g., downlink control information (DCI)). This stage may not be required if there is no DCI to transfer.

In some aspects, the communication device (e.g., BS 110, communication device 320) may perform modulation, at modulation stage 591, to the multiplexed code blocks. Modulation generally refers to process of changing bit sequence ('1' or '0') into a modulation symbol sequence, which typically includes complex numbers representing the set of modulation symbols). For example, pi/2 BPSK maps 1 bit onto each modulation symbol. QPSK maps 2 bits onto each modulation symbol; 16 QAM maps 4 bits onto each modulation symbol; 64 QAM maps 5 bits onto each modulation symbol; and 256 QAM maps 6 bits onto each modulation symbol.

A communication device may provide differential protection to the different code blocks and/or transport blocks. For example, the communication device (e.g., BS 110, communication device 320) may provide differential protection or reliability to different code blocks and/or transport blocks (e.g., the data streams composed thereof) by applying different modulation scheme to some of code blocks and/or transport blocks thereof. As a non-limiting example, the communication device (e.g., BS 110, communication device 320) may perform modulation, at modulation stage 591, for signal that comprises the first DRB 511 by using higher modulation scheme (e.g., 16 QAM), and perform modulation, at modulation stage 591, for signal that comprises the second DRB 512 513 by using lower modulation scheme (e.g., 4 QAM).

In some aspects, the communication device (e.g., BS 110, communication device 320) may perform resource mapping, at resource mapping stage 593, to a plurality of modulated symbols. Resource mapping function involves mapping modulation symbols, generally pre-coded modulation symbols, onto the resource elements (REs) in the allocated resource blocks (RBs), for example, such as Physical Resource Blocks (PRBs). These resource blocks are then used to generate OFDM signal waveform, at OFDM signal generation stage 595. The waveform is the baseband signal which is mixed to RF before being radiated or transmitted, across the air-interface. For 3GPP NR, OFDM signal generation stage 595 may involve in generating CP-OFDM signal for downlink signal transmission, and generating CP-OFDM or DFT-S-OFDM for uplink signal transmission. As indicated above, FIG. 5 is provided as an example. Other examples may differ from what is described with respect to FIG. 5.

Figure 6:
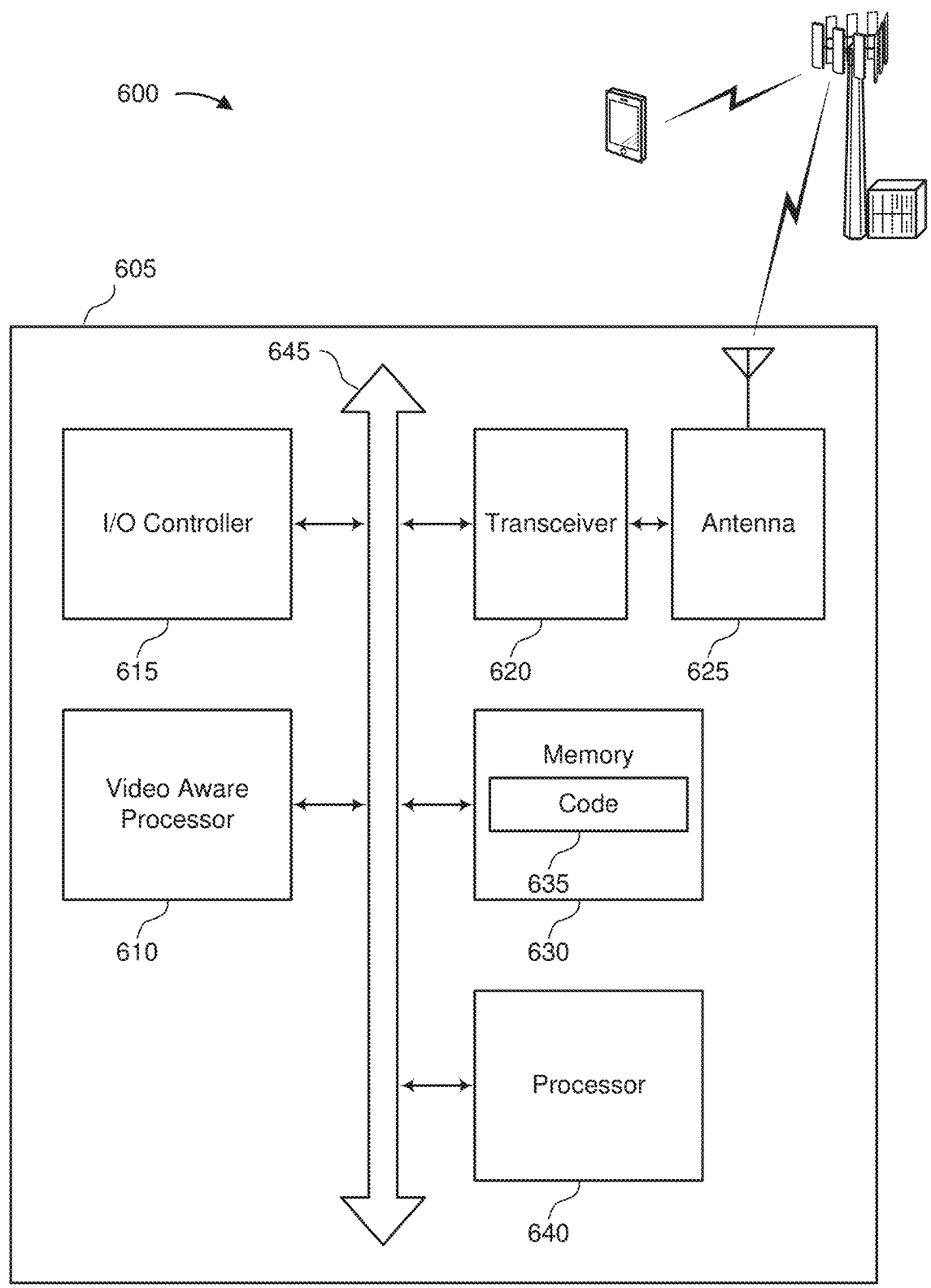
FIG. 6 is a diagram of a system including a device that supports video aware communication with multiple transport blocks in accordance with aspects of the present disclosure.

FIG. 6 is a diagram of a system 600 illustrating a device 605 that supports video aware communication with multiple transport blocks in accordance with aspects of the present disclosure. The device 605 may be an example of BSs 110 (shown as BS 110a, BS 110b, BS 110c, and BS 110d) or include the components of BSs 110 as described herein. The device 605 may include components for bi-directional video data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The video aware processor 610 may perform video aware communication with multiple transport blocks in accordance with various aspects of the present disclosure. In some aspects, the video aware processor 610 may perform classifying a plurality of packets of streaming video content based at least in part on one or more video characteristics, wherein the one or more video characteristics relate to an effect of a packet on a quality of experience of providing the streaming video content; assigning the plurality of packets to a plurality of data radio bearers (DRBs), wherein a first DRB, of the plurality of DRBs, includes a first subset of the plurality of packets and a second DRB, of the plurality of DRBs, includes a second subset of the plurality of packets, wherein the effect of the first subset of the plurality of packets on the quality of experience is higher than the effect of the second subset of the plurality of packets on the quality of experience; generating a plurality of transport blocks, wherein a first transport block, of the plurality of transport blocks, includes the first DRB and a second transport block, of the plurality of transport blocks, includes a second DRB; and providing the plurality of transport blocks for transmission.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touch-screen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

The memory 630 may include random-access memory (RAM) and read-only memory (ROM). The memory 630 may store computer-readable, computer-executable code 635 including instructions that, when executed, cause the processor to perform various functions described herein. In some cases, the memory 630 may contain, among other things, a basic input/output system (BIOS) which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting video aware communication with multiple transport blocks).

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

FIG. 7 is a diagram illustrating an example process 700 performed, for example, by a communication device, in accordance with various aspects of the present disclosure. Example process 700 is an example where the communication device (e.g., BS 110 and/or device 605) performs operations associated with video aware communication with multiple transport blocks for wireless transmission.

As shown in FIG. 7, in some aspects, process 700 may include classifying a plurality of packets of streaming video content based at least in part on one or more video characteristics. The one or more video characteristics may be related to an effect of a packet on a quality of experience of providing the streaming video content (block 710). For example, the communication device (e.g., using the video aware processor 610, controller/processor 240, transmit processor 220, TX MIMO processor 230, MOD 232, antenna 234, and/or the like) may classify a set of packets of streaming video content based at least in part on one or more video characteristics, as described above. In some aspects, the one or more video characteristics may be related to an effect of a packet on a quality of experience of providing the streaming video content in accordance with various aspects of the present disclosure.

As further shown in FIG. 7, in some aspects, process 700 may include assigning the plurality of packets to a plurality of data radio bearers (DRBs). A first DRB, of the plurality of DRBs, may include a first subset of the plurality of packets and a second DRB, of the plurality of DRBs, may include a second subset of the plurality of packets, and the effect of the first subset of the plurality of packets on the quality of experience is higher than the effect of the second subset of the plurality of packets on the quality of experience (block 720). For example, the communication device may assign the plurality of packets to a plurality of data radio bearers (DRBs). In one implementation, the communication device (e.g., using the video aware processor 610, controller/processor 240, transmit processor 220, TX MIMO processor 230, MOD 232, antenna 234, and/or the like) may assign the first subset of packets to a first DRB 511 and the second subset of packets to a second DRB 512 513. The assignment of the first and second subsets of packets to the first and second DRBs, respectively, may be performed based on the their effect on the quality of experience difference.

As further shown in FIG. 7, in some aspects, process 700 may include generating a plurality of transport blocks (block 730). For example, the communication device (e.g., using the video aware processor 610, controller/processor 240, transmit processor 220, TX MIMO processor 230, MOD 232, antenna 234, and/or the like) may generate a plurality of transport blocks, as described above. In one implementation, the communication device may generate a first transport block, of the plurality of transport blocks, to include the first DRB 511 and a second transport block, of the plurality of transport blocks, to include a second DRB 512 513. In another implementation, the communication device may generate a plurality of transport blocks based video frame type such as I-frame category 501, P-frame category 503, or B-frame category 502. These are simply non-limiting examples of categories that may be used.

As further shown in FIG. 7, in some aspects, process 700 may include providing the plurality of transport blocks for transmission (block 740). For example, the communication device (e.g., using the video aware processor 610, controller/processor 240, transmit processor 220, TX MIMO processor 230, MOD 232, antenna 234, and/or the like) may provide the plurality of transport blocks as described above with respect to FIG. 5.

Process 700 may include additional aspects, such as any single aspect or any combination of aspects described below and/or in connection with one or more other processes described elsewhere herein. Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a communication device, comprising:
   classifying a plurality of video streaming packets based at least in part on one or more video characteristics, wherein the one or more video characteristics correspond to information related with video frame type or Discrete Cosine Transform (DCT) coefficients;
   assigning the plurality of video streaming packets to a plurality of data radio bearers (DRBs) based on the classification, wherein a first DRB, of the plurality of DRBs, includes a first subset of video streaming packets and a second DRB, of the plurality of DRBs, includes a second subset of video streaming packets;
   generating a plurality of transport blocks, wherein a first transport block, of the plurality of transport blocks, includes the first DRB and a second transport block, of the plurality of transport blocks, includes a second DRB; and
   providing the plurality of transport blocks for transmission.

2. The method of claim 1, wherein providing the plurality of transport blocks for transmission comprises:
   applying a first redundancy to the first transport block; and
   applying a second redundancy to the second transport block, wherein the first redundancy is higher than the second redundancy.

3. The method of claim 2, wherein the first redundancy results in a first coding rate and the second redundancy result in a second coding rate different from the first coding rate.

4. The method of claim 3, wherein the first coding rate is lower than the second coding rate.

5. The method of claim 1, wherein providing the plurality of transport blocks for transmission comprises:
   assigning a first quality of service (QoS) level to the first transport block; and
   assigning a second QoS level to the second transport block, wherein the first QoS is higher than the second QoS.

6. The method of claim 5, wherein assigning the first QoS level to the first transport block comprises applying a first modulation order to the first transport block, and assigning the second QoS level to the second transport block comprises applying a second modulation order to the second transport block, wherein the first modulation order is higher than the second modulation order.

7. The method of claim 5, wherein assigning the first QoS level to the first transport block comprises applying a first channel coding scheme to the first transport block, and assigning the second QoS level to the second transport block comprises applying a second channel coding scheme to the second transport block, wherein the first channel coding scheme is different than the second channel coding scheme.

8. The method of claim 1, wherein the video frame type includes intra-code picture frame (I-frame), predicted picture frame (P-frame), or the bidirectional predicted picture frame (B-frame).

9. The method of claim 1, wherein the first DRB comprises a first plurality of video frames encoded based on intra-code picture frame (I-frame), and the second DRB comprises a second plurality of video frames encoded based on predicted picture frame (P-frame) or bidirectional predicted picture frame (B-frame).

10. An apparatus for wireless communication, comprising:
one or more processors,
memory coupled with the one or more processors; and
instructions stored in the memory and executable by the one or more processors to cause the apparatus to:
classify a plurality of video streaming packets based at least in part on one or more video characteristics, wherein the one or more video characteristics correspond to information related with video frame type or Discrete Cosine Transform (DCT) coefficients;
assign the plurality of video streaming packets to a plurality of data radio bearers (DRBs) based on the classification, wherein a first DRB, of the plurality of DRBs, includes a first subset of video streaming packets and a second DRB, of the plurality of DRBs, includes a second subset of video streaming packets;
generate a plurality of transport blocks, wherein a first transport block, of the plurality of transport blocks, includes the first DRB and a second transport block, of the plurality of transport blocks, includes a second DRB; and
provide the plurality of transport blocks for transmission.

11. The apparatus of claim 10, wherein the memory further comprises instructions that, when executed by the one or more processors, cause the apparatus to:
apply a first redundancy to the first transport block; and
apply a second redundancy to the second transport block, wherein the first redundancy is higher than the second redundancy.

12. The apparatus of claim 11, wherein the first redundancy results in a first coding rate and the second redundancy result in a second coding rate different from the first coding rate.

13. The apparatus of claim 12, wherein the first coding rate is lower than the second coding rate.

14. The apparatus of claim 10, wherein the memory further comprises instructions that, when executed by the one or more processors, cause the apparatus to:
assign a first quality of service (QoS) level to the first transport block; and
assign a second QoS level to the second transport block, wherein the first QoS is higher than the second QoS.

15. The apparatus of claim 14, wherein the memory further comprises instructions that, when executed by the one or more processors, cause the apparatus to:
apply a first modulation order the first transport block, and
apply a second modulation order to the second transport block, wherein the first modulation order is higher than the second modulation order.

16. The apparatus of claim 14, wherein the memory further comprises instructions that, when executed by the one or more processors, cause the apparatus to:
apply a first channel coding scheme the first transport block, and
apply a second channel coding scheme to the second transport block, wherein the first channel coding scheme is different than the second channel coding scheme.

17. The apparatus of claim 10, wherein the video frame type includes intra-code picture frame (I-frame), predicted picture frame (P-frame), or the bidirectional predicted picture frame (B-frame).

18. The apparatus of claim 10, wherein the first DRB comprises a first plurality of video frames encoded based on intra-code picture frame (I-frame), and the second DRB comprises a second plurality of video frames encoded based on predicted picture frame (P-frame) or bidirectional predicted picture frame (B-frame).

19. An apparatus for wireless communication, comprising:
means for classifying a plurality of video streaming packets based at least in part on one or more video characteristics, wherein the one or more video characteristics correspond to information related with video frame type or Discrete Cosine Transform (DCT) coefficients;
means for assigning the plurality of video streaming packets to a plurality of data radio bearers (DRBs) based on the classification, wherein a first DRB, of the plurality of DRBs, includes a first subset of video streaming packets and a second DRB, of the plurality of DRBs, includes a second subset of video streaming packets;
means for generating a plurality of transport blocks, wherein a first transport block, of the plurality of transport blocks, includes the first DRB and a second transport block, of the plurality of transport blocks, includes a second DRB; and
means for providing the plurality of transport blocks for transmission.

20. The apparatus of claim 19, wherein the means for providing the plurality of transport blocks for transmission comprises:
means for applying a first redundancy to the first transport block; and
means for applying a second redundancy to the second transport block, wherein the first redundancy is higher than the second redundancy.

21. The apparatus of claim 20, wherein the first redundancy results in a first coding rate and the second redundancy result in a second coding rate different from the first coding rate.

22. The apparatus of claim 21, wherein the first coding rate is lower than the second coding rate.

23. The apparatus of claim 19, wherein the means for providing the plurality of transport blocks for transmission comprises:

means for assigning a first quality of service (QoS) level to the first transport block; and means for assigning a second QoS level to the second transport block, wherein the first QoS is higher than the second QoS.

24. The apparatus of claim 23, wherein the means for assigning the first QoS level to the first transport block comprises means for applying a first modulation order to the first transport block, and the means for assigning the second QoS level to the second transport block comprises means for applying a second modulation order to the second transport block, wherein the first modulation order is higher than the second modulation order.

25. The apparatus of claim 23, wherein the means for assigning the first QoS level to the first transport block comprises means for applying a first channel coding scheme to the first transport block, and the means for assigning the second QoS level to the second transport block comprises means for applying a second channel coding scheme to the second transport block, wherein the first channel coding scheme is different than the second channel coding scheme.

26. The apparatus of claim 19, wherein the video frame type includes intra-code picture frame (I-frame), predicted picture frame (P-frame), or the bidirectional predicted picture frame (B-frame).

27. The apparatus of claim 19, wherein the first DRB comprises a first plurality of video frames encoded based on intra-code picture frame (I-frame), and the second DRB comprises a second plurality of video frames encoded based on predicted picture frame (P-frame), or the bidirectional predicted picture frame (B-frame).

* * * * *